Aug. 18, 1970     H. PERSSON     3,524,262

SETTING GAUGE FOR WORK-HOLDERS

Filed May 6, 1969

INVENTOR.
HENRY PERSSON
BY
Ralph R. Roberts
AGENT

United States Patent Office 3,524,262
Patented Aug. 18, 1970

3,524,262
SETTING GAUGE FOR WORK-HOLDERS
Henry Persson, 224 Glenwood Ave.,
Bloomfield, N.J. 07003
Filed May 6, 1969, Ser. No. 822,127
Int. Cl. B27g 23/00
U.S. Cl. 33—185                              5 Claims

ABSTRACT OF THE DISCLOSURE

This invention relates to a setting gauge for precisely positioning work-holding vises as used with machine tools, and in particular with vises which are removably mounted on the worktables of milling and grinding machine tools. This setting gauge has a tenon or tongue portion disposed so as to be grasped in the jaws of the vise. This gauge has pairs of gauge-setting points either precisely parallel to, or precisely at right angles to the tenon or tongue of the gauge. To precisely position a vise, the tenon of the setting gauge is clamped in the jaws of the vise, which vise is in a movable condition on the worktable of the machine tool. The worktable is moved until a pair of gauge-setting points are brought into engagement with the ground face of the column of the machine tool whereat the vise is clamped to the worktable.

BACKGROUND OF THE INVENTION

Field of the invention

The field of art to which this invention pertains is found in the class of Geometrical Instruments and more particularly in the subclasses identified as "Gauges-Collocating" and the subclass thereunder as "Collocating—Machine Parts." Gauges of a generally similar nature also possibly may be found in the class of Work-Holders and more particularly in the subclass of "Hand Maneuvered or Work Supported Tool Guides."

DESCRIPTION OF THE PRIOR ART

In the use of a vise as a work holder mounted on the worktable of a machine tool, the jaws of said vise are often required to be in a precise relation to the travel of the worktable. When this condition occurs, with the jaws of the vise positioned parallel to or at right angles to the travel of the machine tool worktable, the common method used, prior to this invention, is to mount a dial indicator upon the head of the machine tool and to pass the face of the vise jaw in way of the indicator. In using this method for aligning the vise jaw with the travel of the worktable of the machine tool, and when the jaws of the vise are to be set with a high degree of accuracy, such as a thousandth of an inch in the length of a six-inch vise jaw, the aligning may require a machinist to expend several minutes to align the vise. The time required to align the jaws of the vise may be extended if there is a distortion of the vise jaw caused by nicks, wear, and bowing. This lack of precision in the vise jaw often makes the precise aligning of the vise jaw very difficult if not impossible.

In certain cases where the removing and replacing of the vise onto the worktable of the machine tool occurs rather frequently, and the precise setting of the vise in relation to the travel of the worktable must be precise, it may be practical for the owner of the shop to establish setting buttons on the base of the vise which are then aligned and mounted in a finished T-slot of the worktable. This method has its drawbacks in that chips and dirt tend to accumulate in the T-slot. This very often induces wear upon the setting buttons or displacement of the buttons from the surface of the T-slot. In the case of swivel vises that have their heads disposed to be rotated and clamped in relation to the base, there is an additional handicap in the precise positioning of the jaws in that the vise setting of the swivel head in relation to the base may be misadjusted or moved from its prior adjustment during other operations. If the reestablishing of the original or determined setting is to be made by a matching of inscribed indicia upon the mating or adjacent portions of the swivel vise, an inaccurate setting through an error in the reading of the indicia results in a vise portion not as accurate as required.

Setting gauges are of course well known in the field of machine shop work. Most gauges are specially made and are for use in checking the performance of specific matching operations. Fixed gauges are also known in the art of precisely laying of brick, cement blocks and the like. Adjustable stops which may be clamped to the worktable are also well known, but insofar as has been discovered it is new and novel to provide a precise gauge which is adapted to be clamped in the jaws of a vise and when clamped therein the gauge presents a pair of gauge buttons which may be brought into engagement with the ground front face of the column of a machine tool to align the vise precisely with the ground face of the column of the machine tool.

SUMMARY OF THE INVENTION

To obviate the many difficulties of using present methods of alignment of the jaws of vises, my invention provides a gauge which has a general configuration or shape of an "H" wherein two pairs of legs extend from the mid-bar portion of the "H." Each pair of leg portions has end pads which are finished to lie in planes generally parallel to each other and to a tenon or tongue extending from the mid-bar portion of the setting gauge. Pairs of pads are also provided on each other side of the setting gauge with the pads normal to the axis of the tenon. Within each of these end and side portions are adjustably mounted a hardened contact button. These buttons are adjustably mounted so that at the time of initial assembly of the setting gauge the outer ends may be precisely positioned. In case of wear or accident at a later point in the use of the setting gauge, the buttons may be readjusted to bring the gauge once again into its desired degree of precise alignment. In use, the tenon or tongue of the setting gauge is placed within the jaws of the machine tool vise and tightened therein. The mounting bolts holding the vise to the machine tool table are loosened sufficiently so that the vise is movable within determined limits on the worktable of the machine tool. The worktable of the machine tool is then moved towards the column of this machine tool, until the contact points of the setting gauge are brought into engagement with the finished face of the column of the machine tool. With the contact points in a light engagement with the ground face, the holddown bolts holding the vise to the worktable are tightened to clamp the vise to the worktable in a precise alignment with the ground face of the machine tool.

It is an object of this invention to provide a gauge and aligning device enabling a vise to be precisely positioned on the worktable of a machine, said vise being removably mounted on the worktable of the machine tool.

It is a further object of this invention to provide a gauge and aligning device for precisely positioning a vise on the worktable of a machine tool. This gauge is of a generally H-shape and has a tenon formed on the midbar portion of the H-shape. A gauge point is provided in the end of each leg with the points being arranged in pairs to lie in a plane parallel to the tenon. There is also a pair of gauge points mounted in pads provided on the outside of each of the longitudinal sides of the gauge, each side pair of points being arranged parallel to the other or opposite pair and at right angles to the tenon.

INTENT OF THE DISCLOSURE

Although the following disclosure offered for public dissemination is detailed to insure adequacy and aid in understanding of the invention, this is not intended to prejudice that purpose of a patent which is to cover each new inventive concept therein no matter how it may later be disguised by variations in form or additions of further improvements. The claims at the end hereof are intended as the chief aid toward this purpose, as it is these that meet the requirement of pointing out the parts and improvements in which the inventive concept is found.

There has been chosen a specific embodiment of the setting gauge for use in the alignment of a vise movably mountable on a worktable of a machine tool. This specific embodiment has been chosen for the purposes of illustration and description as shown in the accompanying drawing wherein:

Figure 1:
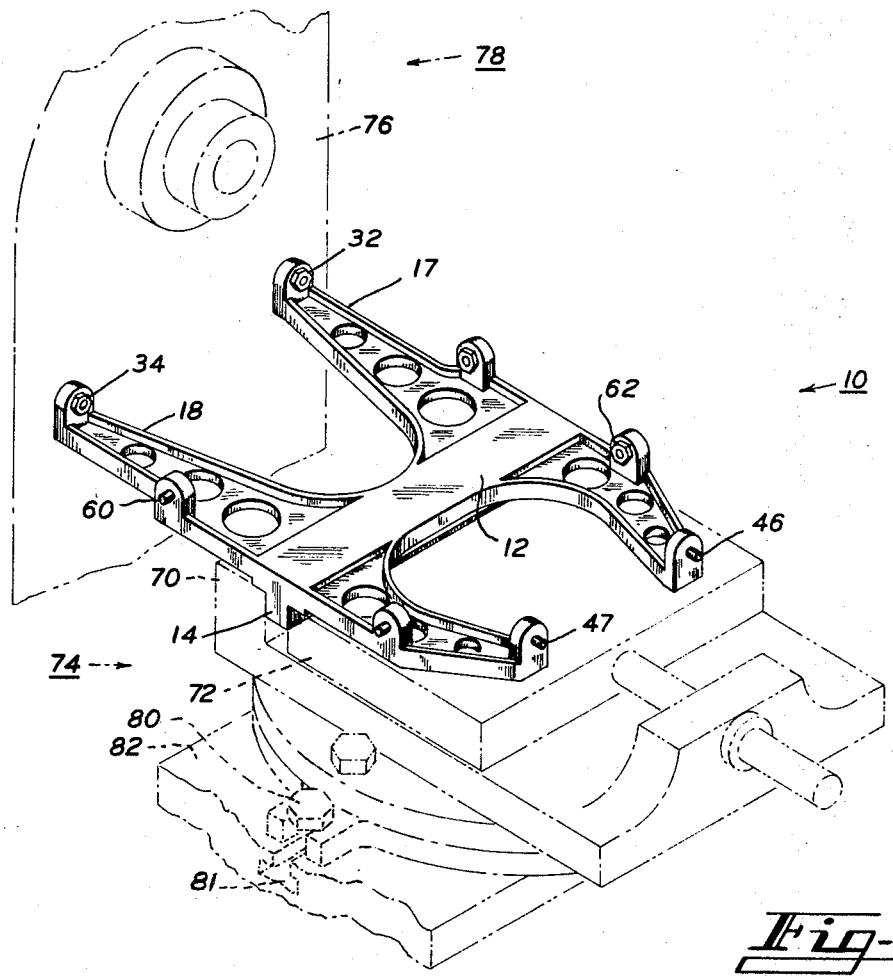
FIG. 1 represents an isometric view of the setting gauge or setting gauge of this invention with the vise and machine tool shown in phantom outline.

In the following description and in the claims various details are identified by specific names for convenience, these names, however, are intended to be generic in their application. Corresponding reference characters refer to like members throughout the two figures of the drawing. The drawing accompanying, and forming part of this specification, discloses certain details of construction of a preferred embodiment for the purpose of explanation of the broader aspects of the invention, but it should be understood that structural details may be modified in various respects without departure from the concept and principles of the invention.

DESCRIPTION OF THE PREFERRED EMBODIMENT

Figure 2:
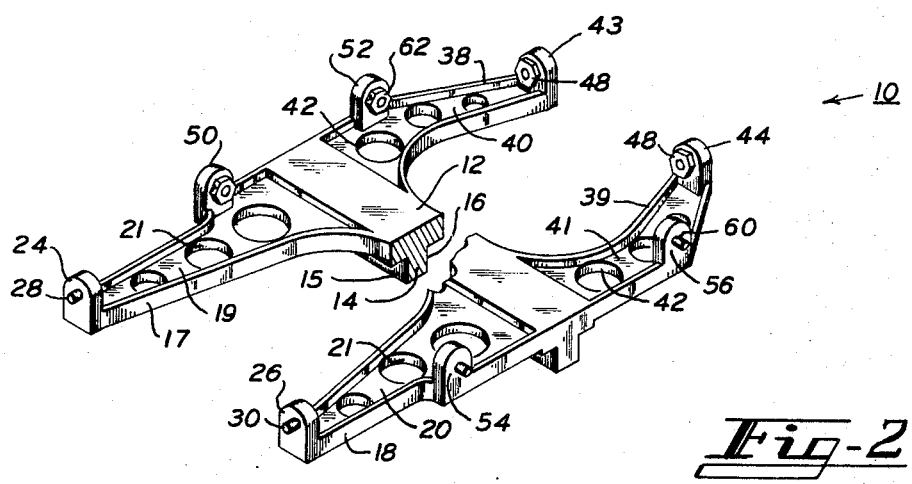
FIG. 2 represents an isometric view of the setting gauge of FIG. 1 with the setting gauge turned at ninety degrees from the position of FIG. 1 and with a portion of the mid-bar of the gauge broken away to show the preferred constructional details of the tenon of the setting gauge.

Referring now to FIGS. 1 and 2, it is to be noted that the setting gauge of this invention is preferably made of metal such as cast aluminum and with a basic member generally identified as 10. This cast member is made in generally one plane and in the general shape or configuration of an "H." The center or mid-bar portion 12 of the H-shape has a cross section construction generally in the shape of a "T." The downwardly extending portion forming the stem 14 of the "T" is machined on its sides 15 and 16 so as to be precisely parallel to each other and with the stem extending below and generally at right angles to the plane of the "H" frame to provide thereby a gripping tenon or tongue member. Extending from the main bar portion 12 are substantially triangular leg members 17 and 18, which leg members, as shown, have external rib edges or rims. Web members 19 and 20 providing stiffness to the leg members lie between the external edges and lightening holes 21 are formed in these web portions. On the external or distal end of the legs 17 and 18 are formed upstanding pads 24 and 26 whose outer faces are machined or formed so as to lie in the same plane, which plane is substantially parallel to the tenon or tongue portion 14. In these pad portions 24 and 26 are threadedly mounted hardened gauge buttons 28 and 30. As viewed in FIG. 1, the threaded inner portions of the shank of the buttons 28 and 30 have locking nuts 32 and 34 mounted respectively thereon.

Extending from the opposite side of the mid-bar portion 14 are shorter leg members 38 and 39, which leg members are also of a generally triangular nature, but are shorter in extent. As with legs 17 and 18 the legs 38 and 39 also preferably have upstanding edges or side ribs as well as stiffening webs 40 and 41 disposed between the ribs. Lightening holes 42 are also preferably formed in the webs. The distal ends of these legs 38 and 39 have upturned pads 43 and 44, whose faces are machined to provide outward surfaces generally in a plane parallel to the plane of the tenon 14. As with the pad portions 24 and 26 at the other end of the setting gauge there are formed in pads 43 and 44 a threaded hole in each pad. Gauge buttons 46 and 47 are mounted in the pad portions and lockouts 48 and are mounted on the inner threaded portions of gauge buttons 46 and 47.

Referring again to the drawing, it is to be noted that at right angles to the tenon or tongue 14 are two pairs of upstanding pad members. These pad members form part of the outer or external stiffening ribs of the legs 18, 19, 38 and 39 and these extending pad members are identified as 50, 52, 54 and 56. Into each of these pads are threadedly mounted like gauge buttons 60 with like locknuts 62 mounted on the inner threaded shanks of the buttons.

CONSTRUCTION OF THE SETTING GAUGE

In the construction of the setting gauge, as shown, the tenon or tongue 14 is precisely machined with faces 15 and 16 having a determined degree of accuracy, finish and and straightness. Whatever the degree of surface finish is selected, the faces 15 and 16 are made precisely parallel within a determined tolerance usually less than one thousandth of an inch. The pads 24, 26, 43 and 44 are provided with drilled and tapped holes in which are mounted the gauge buttons 28, 30, 46 and 47. At right angles to the tenon or tongue 14 are pads 50, 52, 54 and 56, which pads are machined or otherwise finished to merge with the outside ribs to lie in the same plane to provide both stiffness and a finished appearance. Into these pads, and normal to the face of the pads, are drilled and tapped holes into which are mounted gauge buttons 60 which have lock nuts 62 mounted on the threaded inner ends of said gauge buttons.

After the machine work has been completed on a frame of a setting gauge, the frame is positioned in a setting fixture (not shown). The tenon or tongue 14 is clamped in position and the gauge buttons 28 and 30, 46 and 47 are adjusted in their threaded holes to bring the outer ends of the buttons into precise alignment with the sides 15 and 16 of the tenon or tongue 14. With the buttons in a precise adjusted position, the lock nuts 32, 34 and 48 are tightened to retain the gauge buttons in their adjusted and set positions. While still clamped in the setting fixture the gauge buttons 60 in pads 50, 52, 54 and 56 are adjusted to bring their outer ends into precise alignment with a plane which is at exactly ninety degrees to the plane of the tenon 14. After these buttons have been adjusted to a precise position, the locknuts 62 are adjusted to tighten said gauge buttons 60 in their precise adjusted and determined position.

USE AND OPERATION OF SETTING GAUGE

To use the setting gauge the tenon or tongue 14 is placed in between jaws 70 and 72 of a vise 74 as shown in phantom outline in FIG. 1. The vise jaws are then tightened to grip the tenon snugly. As seen in FIG. 1, the legs 17 and 18 of the setting gauge are directed toward the column face 76 of a machine tool 78 also shown in phantom outline The holddown bolts 80 in T-slots 81 of worktable 82 are used to clamp vise 74 to the worktable 82. These bolts 80 are loosened sufficiently to permit the vise to slide on the top surface of the worktable 82. The worktable is then caused to be moved toward the column face until the gauge buttons 28 and 38 are both brought into contact with the finished column face whereupon the inward movement of the worktable is stopped and the holddown bolts 80 are tightened. In this manner and with care taken to maintain the gauge buttons in like contact with the column face, the vise is clamped to the worktable by tightening holddown bolts 80, and now ready for use as a work-holder, the vise has its jaws disposed in a precise parallelism with the finished column face.

If it is desired to precisely position the jaws of the vise at right angles to the face of the column, then the vise is turned ninety degrees to the arrangement of FIG. 1 and the clamped setting gauge is positioned as in FIG. 2 with the gauge buttons 60 disposed toward the column of the machine tool. As in FIG. 1 described, the gauge buttons are brought into engagement with the column face and the holddown bolts 80 are tightened in the T-slots 81.

With reasonable care and speed, a vise may be readily positioned and tightened to the worktable with an accuracy of less than a thousandth of an inch error. The time required is usually a matter of a few seconds. The extensive time necessary for using an indicator on the head of a machine tool is eliminated and the setting gauge is readily available for a quick check or resetting of the vise in case of an accident during machining.

The opposite ends of the setting gauge provide convenience and differential distances for setting the vise. The opposite sides of the setting gauge provide convenience for setting the vise with the longer legs of the setting gauge disposed to the right or left as desired.

Terms such as "left," "right," "up," "down," "bottom," "top," "front," "back," "in," "out" and the like are applicable to the embodiment shown and described in conjunction with the drawing. These terms are used merely for the purposes of description and do not necessarily apply to the position in which the setting gauge may be constructed or used.

Where other than the angle shown are desired for setting a vise, it is, of course, recognized that pairs of gauge buttons may be arranged in relation to the tenon or tongue at other than the two angles shown. It is only necessary that the casting be altered to provide pads which are cast at the desired angle and with buttons mounted therein.

The conception of the setting gauge for vises and its many applications is not limited to the specific embodiment shown but departures therefrom may be made within the scope of the accompanying claims and without sacrificing its chief advantages and protection is sought to the broadest extent the prior art allows.

What is claimed is:

1. A setting gauge for precisely aligning and positioning a work-holding vise on a worktable of a machine tool, said setting gauge including: (a) a planar member having edge portions defining at least two planes at generally right angles to each other and in a selected configuration; (b) a tenon member extending from and at substantially right angles to the planar member, said tenon having its sidewalls formed with precisely parallel portions adapted for the gripping thereof by the jaws of said work-holding vise; (c) at least two pairs of gauge-setting points adjustably carried by said planar member with one pair of points carried by one edge and being adjustable so as to lie in a plane precisely parallel within five thousandths of an inch or less to the planes of the sidewalls of the tenon, and with at least one other pair of points being carried by an other edge and being adjustable so as to lie in a plane at precisely right angles and within five-thousandths of an inch or less to the planes of the sidewalls of the tenon so that with said tenon gripped in the jaws of the work-holding vise, the pairs of gauge points extend beyond the vise permitting one of the pairs of gauge points to be brought into engagement with a face of the column of the machine tool to precisely align the jaws of said vise with the face of the column of said machine tool.

2. A setting gauge for aligning a work-holding vise as in claim 1 in which the planar member is H-shaped with the mid-bar portion thereof containing the tenon and from this mid-bar portion extend two pairs of legs, each leg having an end pad formed thereon with one of said adjustable gauge points carried in each pad, and in which there are formed pairs of side pads extending from the sides of the legs and in each side pad is mounted a gauge point with said pairs of gauge points having their outer exposed ends disposed in a plane which is precisely at right angles to the planes of the sides of the tenon.

3. A setting gauge as in claim 2 in which the gauge points are carried in end pads formed on the planar member.

4. A setting gauge as in claim 2 in which legs are arranged in opposite pairs with one pair of legs being of greater extent that the other pair, the gauge points in the end pads being arranged in pairs precisely parallel to each other and to the sides of the tenon.

5. A setting gauge as in claim 2 in which the gauge-setting points are threaded members each having a hardened contact end, the threaded members being rotatably mounted in threaded holes formed in the end pads.

References Cited

UNITED STATES PATENTS

| | | | |
|---|---|---|---|
| 770,150 | 9/1904 | Barry | 33—181 |
| 1,045,871 | 12/1912 | Miller. | |
| 1,279,645 | 9/1918 | Bryant. | |
| 2,201,832 | 5/1940 | Kaehlert | 33—163 |
| 2,357,143 | 8/1944 | Smith. | |
| 2,842,859 | 7/1958 | Pyciak | 33—181 |
| 2,930,135 | 3/1960 | Rodtz. | |
| 889,999 | 6/1908 | Wilcox | 33—181 |

WILLIAM D. MARTIN, JR., Primary Examiner

U.S. Cl. X.R.

33—168